United States Patent
Bhangu et al.

(10) Patent No.: US 12,513,043 B2
(45) Date of Patent: Dec. 30, 2025

(54) SYSTEM, METHOD, AND COMPUTER PROGRAM FOR MANAGING MACHINE LEARNING MODELS IN A NETWORK

(71) Applicants: RAKUTEN SYMPHONY, INC., Tokyo (JP); RAKUTEN MOBILE, INC., Tokyo (JP)

(72) Inventors: Manmeet Singh Bhangu, Andaman and Nicobar Islands (IN); Kenichiro Aoyagi, Tokyo (JP)

(73) Assignees: RAKUTEN SYMPHONY, INC., Tokyo (JP); Rakuten Mobile, Inc., Tokyo (JP)

(*) Notice: Subject to any disclaimer, the term of this patent is extended or adjusted under 35 U.S.C. 154(b) by 44 days.

(21) Appl. No.: 18/293,251

(22) PCT Filed: Aug. 31, 2023

(86) PCT No.: PCT/US2023/031597
§ 371 (c)(1),
(2) Date: Jan. 29, 2024

(87) PCT Pub. No.: WO2025/023946
PCT Pub. Date: Jan. 30, 2025

(65) Prior Publication Data
US 2025/0080413 A1    Mar. 6, 2025

(30) Foreign Application Priority Data
Jul. 26, 2023    (IN) .............................. 202341050553

(51) Int. Cl.
G06F 15/16    (2006.01)
G06N 20/00    (2019.01)
H04L 41/0806    (2022.01)

(52) U.S. Cl.
CPC ......... H04L 41/0806 (2013.01); G06N 20/00 (2019.01)

(58) Field of Classification Search
CPC ........................... H04L 41/0806; G06N 20/00
USPC ........................................................ 709/222
See application file for complete search history.

(56) References Cited

U.S. PATENT DOCUMENTS

| | | | |
|---|---|---|---|
| 10,380,504 B2* | 8/2019 | Bendre | G06F 40/20 |
| 11,516,139 B2* | 11/2022 | Ismailsheriff | H04L 47/29 |
| 11,562,176 B2* | 1/2023 | Iashyn | G06N 20/00 |
| 11,698,775 B2* | 7/2023 | Nupponen | G06N 3/045 |
| | | | 717/113 |
| 11,716,379 B2* | 8/2023 | Sundaresan | H04L 9/0643 |
| | | | 709/201 |
| 11,824,872 B1* | 11/2023 | Meyer | G06F 21/6245 |
| 11,989,216 B2* | 5/2024 | Ceze | G06F 16/3346 |
| 12,216,927 B2* | 2/2025 | Richardson | H04L 67/1095 |
| 2020/0272859 A1* | 8/2020 | Iashyn | G06F 18/217 |
| 2021/0125105 A1* | 4/2021 | Xie | G06N 5/022 |

(Continued)

*Primary Examiner* — Moustafa M Meky
(74) *Attorney, Agent, or Firm* — Sughrue Mion, PLLC

(57) ABSTRACT

Provided are system, method, and device for managing machine learning models in a network. According to embodiments, the system may include: a memory storage storing computer-executable instructions; and at least one processor communicatively coupled to the memory storage, wherein the at least one processor may be configured to execute the instructions to: store one or more machine learning model; and distribute the one or more machine learning model to one or more target network element in a network.

20 Claims, 8 Drawing Sheets

(56) References Cited

U.S. PATENT DOCUMENTS

| | | | |
|---|---|---|---|
| 2021/0258371 A1* | 8/2021 | Sundaresan | H04L 67/12 |
| 2021/0349697 A1* | 11/2021 | Nupponen | G06N 20/10 |
| 2021/0357800 A1* | 11/2021 | Sharma | G06N 20/00 |
| 2022/0092479 A1* | 3/2022 | Shin | H04L 67/10 |
| 2023/0078218 A1* | 3/2023 | Wang | G06N 3/098 |
| | | | 706/12 |
| 2023/0109079 A1* | 4/2023 | Yokoyama | G06N 3/084 |
| | | | 706/12 |
| 2023/0177402 A1* | 6/2023 | Goodsitt | G06N 20/20 |
| | | | 706/12 |
| 2024/0014981 A1* | 1/2024 | Yang | G06N 3/096 |

* cited by examiner

SYSTEM, METHOD, AND COMPUTER PROGRAM FOR MANAGING MACHINE LEARNING MODELS IN A NETWORK

CROSS REFERENCE TO RELATED APPLICATIONS

This application is a National Stage of International Application No. PCT/US2023/031597 filed Aug. 31, 2023, claiming priority based on India Patent Application No. 202341050553 filed Jul. 26, 2023.

TECHNICAL FIELD

Systems, methods, and computer programs consistent with example embodiments of the present disclosure relate to a telecommunication network, and more specifically, relate to dynamic management of machine learning models in a telecommunication network.

BACKGROUND

In a telecommunication network, artificial intelligence and machine learning techniques may be utilized in order to optimize, enhance, and improve the performance of the network. For example, in response to the increase in data traffic, proliferation of connected devices, and demand for real-time services, machine learning techniques may be utilized for network resource allocation, traffic pattern prediction, network congestion management, and the like in order to improve the quality of service and reduce operational costs for the network. In order for the network to utilize machine learning techniques, machine learning models used for the machine learning techniques may be trained and stored, as well as distributed to target network elements (such as user equipment and edge sites) of the network for utilization.

In the related art, there are difficulties in the management (training, storing, distributing, and the like) of the machine learning models due to the network being geographically spread out across a wide area.

As such, there is a need for a centralized management system that is able to train, store, and distribute the machine learning models in the network in an effective and efficient way, such that the target network element is able to consistently utilize an up-to-date machine learning models.

SUMMARY

Example embodiments of the present disclosure dynamically manage machine learning models in a network. As such, example embodiments of the present disclosure improve efficiency and effectiveness of training, storage, and distribution of the machine learning models and allows for the target network elements of the network to be able to consistently utilize an up-to-date machine learning models.

According to embodiments, a system is provided. The system may include: a memory storage storing computer-executable instructions; and at least one processor communicatively coupled to the memory storage, wherein the at least one processor may be configured to execute the instructions to: store at least one machine learning model; and distribute the at least one machine learning model to at least one target network element in a network; wherein the system is implemented as a network function in a core network.

According to embodiments, a method is provided. The method may include: storing at least one machine learning model; and distributing the at least one machine learning model to at least one target network element in a network; wherein the method is performed by a system implemented as a network function in a core network.

According to embodiments, a non-transitory computer-readable recording medium is provided. The non-transitory computer-readable recording medium may have recorded thereon instructions executable by at least one processor of a system to cause the at least one processor to perform a method including: storing at least one machine learning model; and distributing the at least one machine learning model to at least one target network element in a network; wherein the system is implemented as a network function in a core network.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
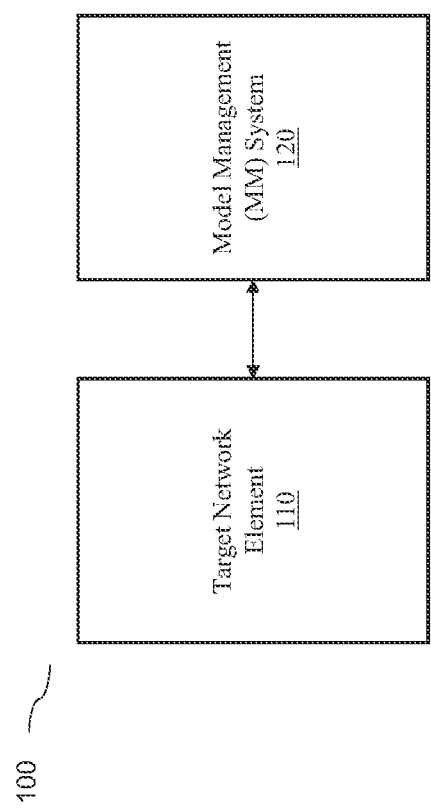
FIG. 1 illustrates a block diagram of an example system configuration for managing machine learning models in a network, according to one or more embodiments.

The following detailed description of example embodiments refers to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Systems, methods, devices, and the like, provided in the example embodiments of the present disclosure dynamically manage machine learning models in a network.

According to embodiments, the system may store at least one machine learning model that is to be utilized by at least one target network element in a network, and may distribute the at least one machine learning model to the at least one target network element for utilization. According to embodiments, such system may include a central module and at least one edge module that may be implemented as a network function in a core network. For instance, the central module and at least one edge module may be implemented as a network function called Model Repository Function (MRF) in a 5G core network.

Ultimately, example embodiments of the present disclosure dynamically manage machine learning models in a network, which improves efficiency and effectiveness of training, storage, and distribution of the machine learning models and allows for the target network elements of the network to be able to consistently utilize an up-to-date machine learning models.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the threshold tuning system of the present disclosure, according to one or more embodiments, are provided in the following.

Example System Architecture

FIG. 1 illustrates a block diagram of an example system configuration 100 for managing machine learning models in a network, according to one or more embodiments. As illustrated in FIG. 1, system configuration 100 may include a target network element 110 and a Model Management (MM) system 120.

Target network element 110 may refer to network element within the network that is configured to utilize machine learning models to perform artificial intelligence and/or machine learning techniques. For example, the target network element 110 may include user equipment (UE), edge sites of a 5G network such as Edge Data Centers, RAN sites, and the like, as well as Operation Administrative and Management (OAM) and $3^{rd}$ Party Application Servers. In some implementations, target network element 110 may be communicatively coupled to the MM system 120 and may transmit data to and receive data from to the MM system 120. According to embodiments, if the target network element 110 is the UE, such UE may be communicatively coupled to the edge site that is communicatively coupled to the MM system 120, such that the MM system 120 is communicatively coupled to the UE via the edge site.

MM system 120 may include a system, a platform, a module, or the like, which may be configured to perform one or more operations or actions for managing machine learning models in a network. According to embodiments, the MM system 120 may be implemented as a network function in a core network, such as a 5G core. According to embodiments, the MM system 120 may be implemented as a service-based network function.

Example operations performable by the MM system 120 for managing machine learning models are described below with reference to FIG. 6 to FIG. 7. Further, several example components which may be included in the MM system 120, according to one or more embodiments, are described below with reference to FIG. 2 and FIG. 4. Furthermore, several example implementations of the MM system 120, according to one or more embodiments, are described below with reference to FIG. 3 and FIG. 5.

Figure 2:
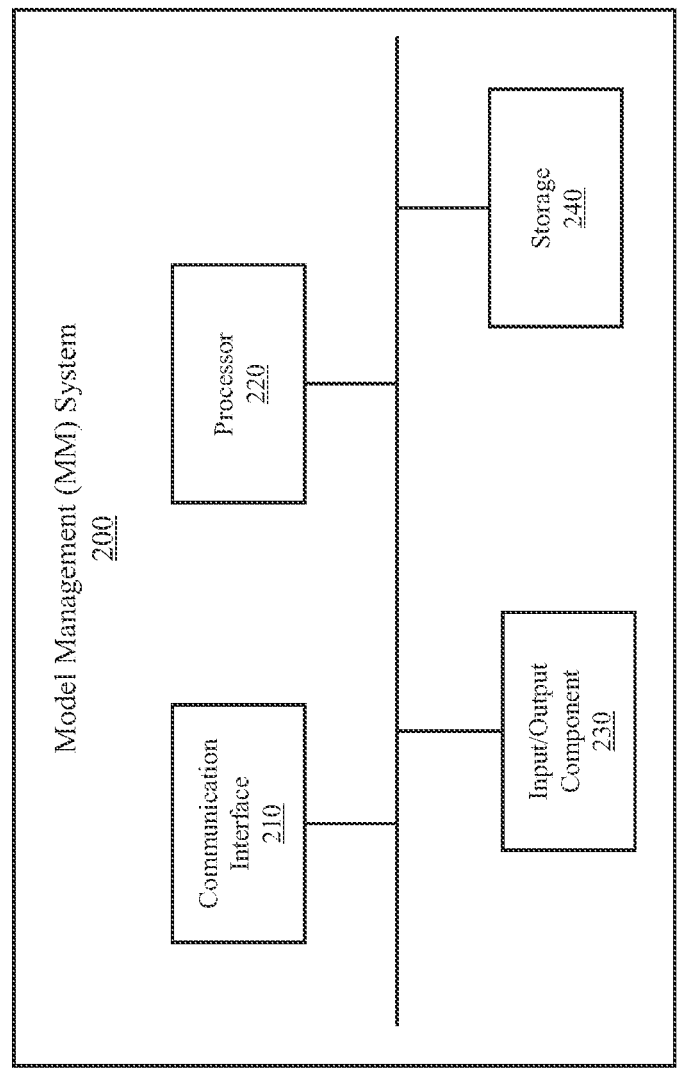
FIG. 2 illustrates a block diagram of example components in a Model Management (MM) system, according to one or more embodiments.

FIG. 2 illustrates a block diagram of example components in a MM system 200, according to one or more embodiments. The MM system 200 may correspond to the MM system 120 in FIG. 1, thus the features associated with the MM system 120 and the MM system 200 may be similarly applicable to each other, unless being explicitly described otherwise.

As illustrated in FIG. 2, the MM system 200 may include at least one communication interface 210, at least one processor 220, at least one input/output component 230, and at least one storage 240, although it can be understood that the MM system 200 may include more or less components than as illustrated in FIG. 2, and/or may be arranged in a manner different from as illustrated in FIG. 2, without departing from the scope of the present disclosure.

The communication interface 210 may include at least one transceiver-like component (e.g., a transceiver, a separate receiver and transmitter, a bus, etc.) that enables the components of the MM system 200 to communicate with each other and/or to communicate with one or more components external to the MM system 200, such as via a wired connection, a wireless connection, or a combination of wired and wireless connections.

For instance, the communication interface 210 may couple the processor 220 to the storage 240 to thereby enable them to communicate and to interoperate with each other in performing one or more operations. As another example, communication interface 210 may couple the MM system 200 (or one or more components included therein) to the target network element 110, so as to enable them to communicate and to interoperate with each other.

According to one or more embodiments, the communication interface 210 may include one or more application programming interfaces (APIs) which allow the MM system 200 (or one or more components included therein) to communicate with one or more software applications (e.g., software application deployed in the target network element 110, etc.).

The input/output component 230 may include at least one component that permits the MM system 200 to receive information and/or to provide output information. It can be understood that, in some embodiments, the input/output component 230 may include at least one input component (e.g., a touch screen display, a button, a switch, a microphone, a sensor, etc.) and at least one output component (e.g., a display, a speaker, one or more light-emitting diodes (LEDs), etc.), each of which may be separated from each other.

The storage 240 may include one or more storage mediums suitable for storing data, information, and/or computer-executable instructions therein. According to embodiments, the storage 240 may include at least one memory storage, such as a random access memory (RAM), a read only memory (ROM), and/or another type of dynamic or static storage device (e.g., a flash memory, a magnetic memory, and/or an optical memory) that stores information and/or instructions for use by the processor 220. Additionally or alternatively, the storage 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 240 may be configured to store information, such as raw data, metadata, or the like. Additionally or alternatively, the storage 240 may be configured to store one or more information associated with one or more operations performed by the processor 220. For instance, the storage 240 may store information defining the historical operation(s) performed by the processor 220 to manage machine learning models, one or more results of operations performed by the processor 220, or the like. Further, the storage 240 may store data or information required in managing machine learning models and/or the machine learning models themselves.

In some implementations, the storage 240 may include a plurality of storage mediums, and the storage 240 may be configured to store a duplicate or a copy of at least a portion of the information in the plurality of storage mediums, for providing redundancy and for backing-up the information or the associated data. Furthermore, the storage 240 may also store computer-readable or computer-executable instructions which, when being executed by one or more processors (e.g., processor 220), causes the one or more processors to perform one or more actions/operations described herein The processor 220 may include at least one processor capable of being programmed or being configured to perform a function(s) or an operation(s) described herein. For instance, the processor 220 may be configured to execute computer-executable instructions stored in at least one storage medium or a memory storage (e.g., storage 240, etc.) to thereby perform one or more actions or one or more operations described herein.

According to embodiments, the processor 220 may be configured to receive (e.g., via the communication interface 210, via the input/output component 230, etc.) one or more signals and/or one or more user inputs defining one or more instructions for performing one or more operations. Further, the processor 220 may be implemented in hardware, firmware, or a combination of hardware and software. For instance, processor 220 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 220 may be configured to collect, to extract, and/or to receive one or more information (in the form of signal or data, etc.), and to process the received one or more information to thereby manage machine learning models.

Descriptions of several example operations which may be performed by the processor 220 are provided below with reference to FIG. 6 to FIG. 7.

Figure 3:
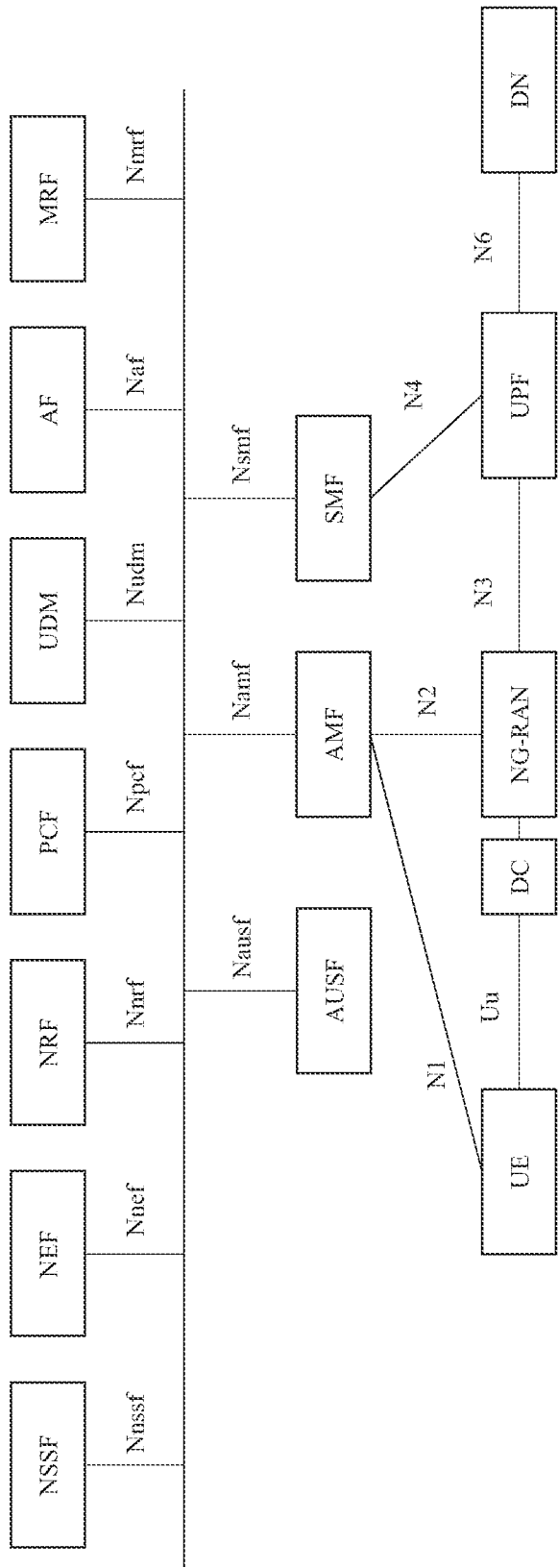
FIG. 3 illustrates a block diagram of an example implementation of the Model Management (MM) system, according to one or more embodiments.

FIG. 3 illustrates a block diagram of an example implementation of the MM system 200, according to one or more embodiments. As illustrated in FIG. 3, the MM system 200 may be implemented as a network function in a network.

For example, as illustrated in FIG. 3, the MM system may be implemented as a network function called Model Repository Function (MRF) in the 5G core network, along with other network functions such as Network Slice Selection Function (NSSF), Network Exposure Function (NEF), Network Repository Function (NRF), Policy Control Function (PCF), Unified Data Management (UDM), Application Function (AF), Authentication Server Function (AUSF), Access and Mobility Management Function (AMF), Session Management Function (SMF), and User Plane Function (UPF).

The NSSF may be configured to communicate with other network functions via the Nnssf interface, and may represent as a logical partition of a 5G network that may provide specific network capabilities and characteristics, such as in support of a particular service. For example, a network slice instance may be a set of network function instances and the required network resources (e.g., compute, storage, communication, and the like) that may provide the capabilities and characteristics of the network slice. In this regard, the NSSF may enable other network functions (e.g., the AMF) to identify a network slice instance that may be appropriate for a User Equipment (UE)'s desired service.

The NEF may be configured to communicate with other network functions via the Nnef interface, and may act as the entry point into the network, by securely exposing the network capabilities and events provided by 3GPP network functions to the AF, and by providing ways for the AF to securely provide information to 3GPP network. For example, the NEF may provide a service that may allow the AF to provision specific subscription data (e.g., expected UE behavior) for various UE.

The NRF may be configured to communicate with other network functions via the Nnrf interface, and may provide service registration and discovery, which may enable network functions to identify appropriate services available from other network functions.

The PCF may be configured to communicate with other network functions via the Npcf interface, and may be responsible for handling policy and Quality of Service (QOS) enforcement in 5G networks. The PCF may manage policies related to network resource allocation, user access control, and service prioritization. The PCF may communicate with other network functions to apply policies and ensure that user and service requirements may be met while optimizing network resource utilization.

The UDM may be configured to communicate with other network functions via the Nudm interface, and may serve as a central repository for user-related data in 5G networks. The UDM may store and manage user-specific information, such as subscriber profiles, authentication credentials, and service subscriptions. The UDM may play a crucial role in ensuring seamless mobility and secure access for users across different network functions.

The AF may be configured to communicate with other network functions via the Naf interface, and may interact with the 5G core to provision information to the network operator and to subscribe to certain events happening in the network. The AF may offer applications for which service is delivered in a different layer (i.e., transport layer) than the one in which the service has been requested (i.e., signaling layer), the control of flow resources according to what has been negotiated with the network.

The AUSF may be configured to communicate with other network functions via the Nausf interface, may be based in a user's home network, and may perform user authentication and compute security key materials for various purposes.

The AMF may be configured to communicate with other network functions via the Namf interface, and may terminate the radio access network control plane (RAN CP) interface and handle all mobility and connection management of UEs (similar to mobility management entity (MME) in an Evolved Packet Core). The AMF may communicate with the UE via an N1 interface, and may communicate with the Next-Generation Radio Access Network (NG-RAN) via an N2 interface.

The SMF may be configured to communicate with other network functions via the Nsmf interface, and may interact with the decoupled traffic (or user) plane, including creating, updating, and removing Protocol Data Unit (PDU) sessions and managing session context with the UPF, e.g., for event reporting. For example, the SMF may perform data flow detection (based on filter definitions included in PCC rules), online and offline charging interactions, and policy enforcement.

The UPF may be configured to communicate with SMF via the N4 interface, and may support handling of user plane traffic based on the rules received from the SMF including packet inspection and different enforcement actions (e.g., event detection and reporting). The UPF may also communicate with the NG-RAN via the N3 interface, and the Data Network (DN) via the N6 interface.

The Next-Generation Radio Access Network (NG-RAN) may be the radio access network in 5G. The NG-RAN may include base stations and related equipment that may connect the UE to the core network. The NG-RAN may provide higher data rates, lower latency, and increased capacity compared to previous generations of radio access networks.

The Data Center (DC) may be a crucial component of the 5G architecture as the DC may host and process vast amounts of data and applications. The DC may provide the computational resources required to deliver high-performance services and support the functionalities of various network functions. The DC may communicate with the UE via the Uu interface.

The Data Network (DN) may be configured to transfer data from one network access point to other one or more network access points via data switching, transmission lines, and system controls. The DN may consist of communication systems such as circuit switches, leased lines, and packet switching networks.

The MRF, which may be a network function implementation of the MM system, may be realized as a containerized network function made up of micro services or may be realized as virtual machine based network function. The MRF may expose a service based interface (Nmrf) to other network function in the core. The MRF may register itself with NRF so that other network functions can discover it. The MRF may be a central repository of all models (RAN, Core, Operation Administrative and Management (OAM), and UE) and may have model management systems, and data transfer protocols optimized for large-scale distribution. In particular, the model management system may allow the MRF to ingest data from different elements in the network, enrich the data, and clean the data in order to train the model using such data.

According to embodiments, the MRF may transmit machine learning models to the NG-RAN via the AMF and the Nmrf and N2 interfaces. In particular, the machine learning models may be shared/pushed by the MRF to the AMF via service based architecture. The MRF may determine which AMF to send the model based on its own data collection with respect to model request and with assistance from the NRF. From the AMF, the model may be sent to, for example, RAN using 3GPP defined N2 interface. This model can be cached at the RAN site.

According to embodiments, the MRF may transmit machine learning models to the UE via NAS message. In particular, the machine learning model may piggyback on the NAS message that is being delivered to the UE. Additional descriptions regarding the functions and operations of MM system/MRF are described below.

According to embodiments, the MRF may be hosted on cloud platforms, such as Azure, AWS, GCF, and the like, as well as on premises. According to embodiments, the functionalities of the MRF may be performed at the Operation Administrative and Management (OAM).

Figure 4:
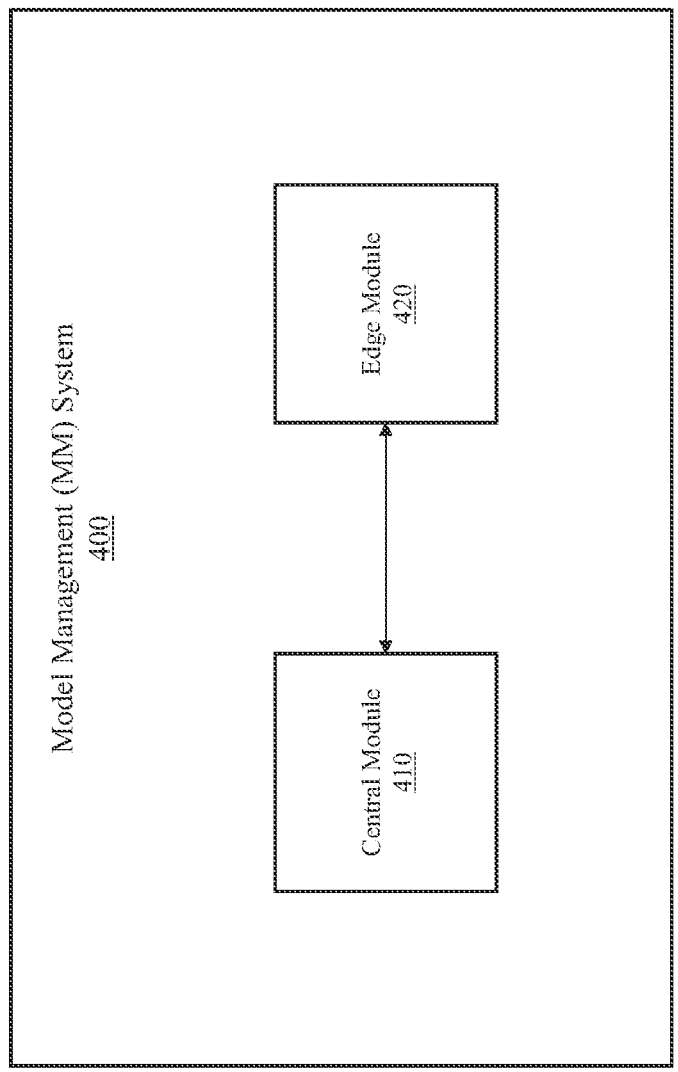
FIG. 4 illustrates a block diagram of example components in a Model Management (MM) system, according to one or more embodiments.

FIG. 4 illustrates a block diagram of example components in a MM system 400, according to one or more embodiments. The MM system 400 may corresponds to the MM system 120 in FIG. 1 and the MM system 200 in FIG. 2, thus the features associated with the MM system 120, the MM system 200, and the MM system 400 may be similarly applicable to each other, unless being explicitly described otherwise.

As illustrated in FIG. 4, the MM system 400 may include a central module 410 and at least one edge module 420, although it can be understood that the MM system 400 may include more or less components than as illustrated in FIG. 4, and/or may be arranged in a manner different from as illustrated in FIG. 4, without departing from the scope of the present disclosure.

The central module 410 may be configured to host model training pipeline and MLops functionality, as well as store the machine learning models. According to embodiments, the central module 410 may be located in the core network, such as a 5G core. According to embodiments, the central module 410 may be communicatively coupled to the at least one edge module 420 in order to transmit and receive data from each other.

The at least one edge module 420 may be configured to store local cache of the machine learning models for inference as well as data ingestion. According to embodiments, the central module 410 may be communicatively coupled to the edge site in order to transmit and receive data from each other, such as to transmit machine learning models to the edge site and/or to the UE communicatively coupled to the edge site. According to embodiments, the at least one edge module 420 may be located in the core network, such as a 5G core. According to embodiments, the at least one edge module 420 may be located at or near the edge site. For example, the at least one edge module 420 may be hosted in an aggregate data center, or may be hosted in a data center next to a RAN/NG-RAN node in the 5G network. As such, the edge module 420 may be co-located with the central module 410 or may be distributed out to compute resources at the edge of the network so that it can be co-located with data sources such as User Plane Function (UPF), MEC management AF or OAM applications. Further, if the central module 410 is used for data collection and training (see below descriptions in relation to FIG. 7), edge module 420 may help reduce data transfer from the edge site to the core network for analytics, by aggregating, merging and filtering the data on the edge site before sending it to the central module 410.

It may be understood that the edge sites may require local model caching systems, inference engines compatible with the model types, and mechanisms to dynamically select and apply models based on the UE's context. It may also be understood that, according to embodiments, an instance of the MRF may be hosted on the edge site.

Figure 5C:
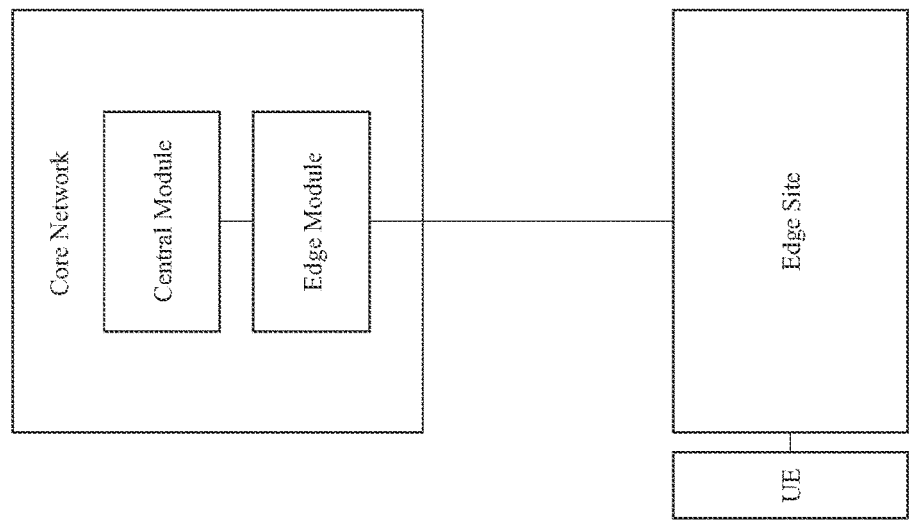
FIG. 5C illustrates a block diagram of a third example implementation of the central module and the edge module, according to one or more embodiments.
Figure 5B:
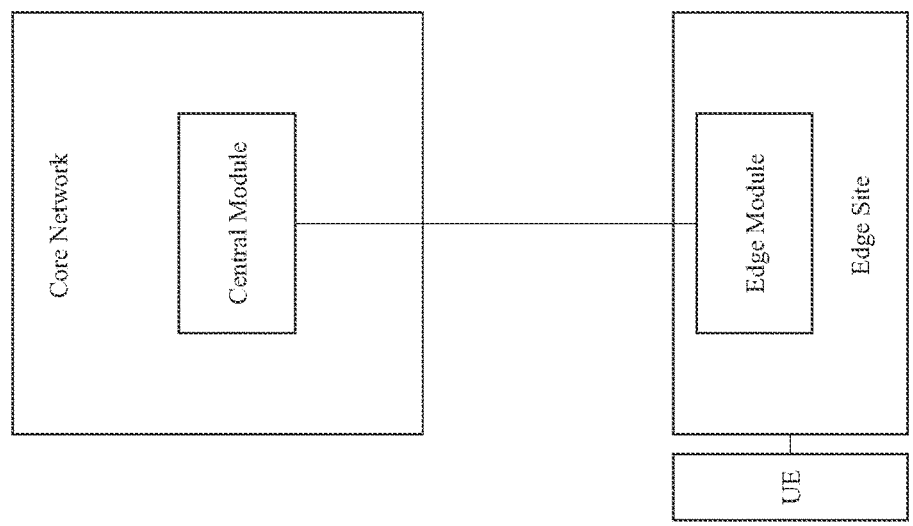
FIG. 5B illustrates a block diagram of a second example implementation of the central module and the edge module, according to one or more embodiments.
Figure 5A:
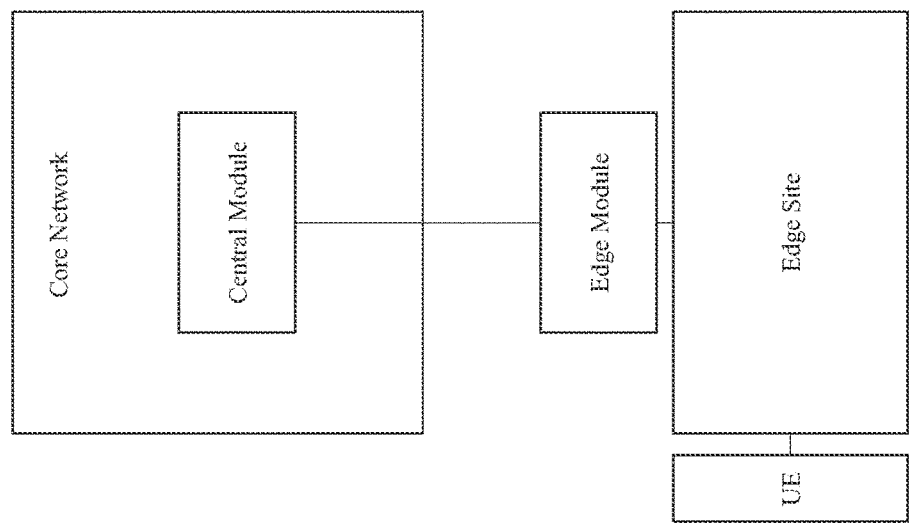
FIG. 5A illustrates a block diagram of a first example implementation of the central module and the edge module, according to one or more embodiments.

FIG. 5A illustrates a block diagram of a first example implementation of the central module and the edge module, according to one or more embodiments. As illustrated in FIG. 5A, the central module may be located in the core network and is communicatively coupled to the edge module that is located near and is communicatively coupled to the edge site (which is communicatively coupled to the UE).

FIG. 5B illustrates a block diagram of a second example implementation of the central module and the edge module, according to one or more embodiments. As illustrated in FIG. 5B, the central module may be located in the core network and is communicatively coupled to the edge module that is located at the edge site (which is communicatively coupled to the UE).

FIG. 5C illustrates a block diagram of a third example implementation of the central module and the edge module, according to one or more embodiments. As illustrated in FIG. 5C, the central module and the edge module may be co-located in the core network, where the edge module is communicatively coupled to the edge site (which is communicatively coupled to the UE).

It may be understood that the central module 410 and at least one edge module 420 may be implemented as a network function, in the similar manner as described with respect to FIG. 3.

It may be understood that the configuration illustrated in FIG. 3 and FIG. 5 are simplified for descriptive purpose, and is not intended to limit the scope of the present disclosure in any way.

It may be understood that, depending on the implementation, the configuration of the central module 410 and at least one edge module 420 in the MM system 400 may be modified and combined as appropriate. For example, the MM system may include: one central module and one edge module located in the core network; one central module located in the core network, one edge module located in the core network, and one edge module located at the edge site; one central module located in the core network and two edge modules located at two different edge sites. Further, it can be understood that multiple instances of MM system may be deployed in a network. For example, if the network is configured to cover a city, the network may deploy four instances of the MM system to cover different geographical portions of the network (e.g., north, south, east, and west portions of the city). It can also be understood that, each of the MM systems may include one central module and at least one edge module, where the central modules may be configured to communicate with each other in order to transmit and receive data.

Example Operations for Storing and Distributing Machine Learning Models in the Present Disclosure In the following, several example operations performable by the MM system of the present disclosure are described with reference to FIG. 6 to FIG. 7.

Figure 6:
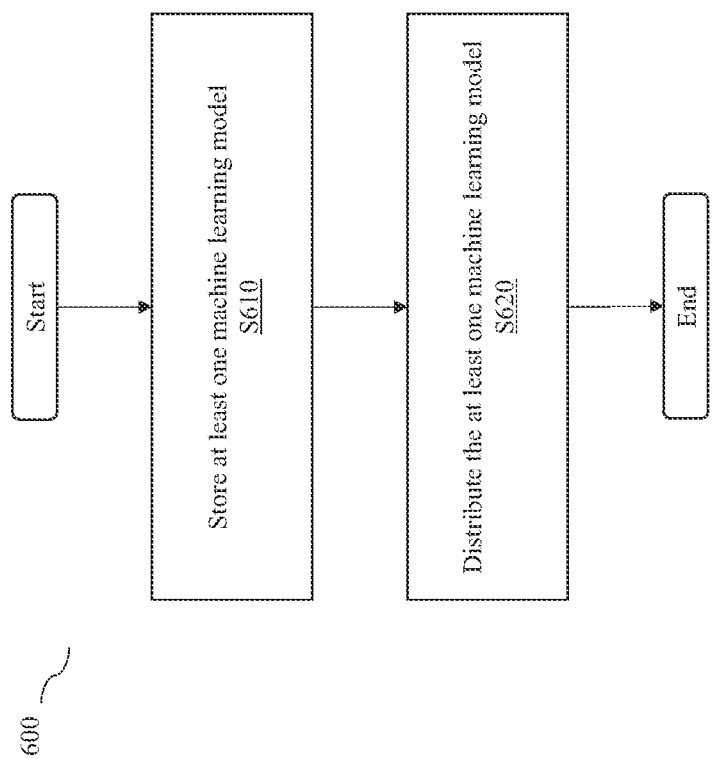
FIG. 6 illustrates a flow diagram of an example method for storing and distributing machine learning models, according to one or more embodiments.

FIG. 6 illustrates a flow diagram of an example method 600 for storing and distributing machine learning models, according to one or more embodiments. One or more operations in method 600 may be performed by at least one processor (e.g., processor 220) of the MM system.

As illustrated in FIG. 6, at operation S610, the at least one processor may be configured to store at least one machine learning model. It may be understood that the at least one machine learning model may be a machine learning model that is to be utilized by at least one target network element. According to embodiments, the at least one target network element may refer to a network element within the network that is configured to utilize the at least one machine learning model to perform artificial intelligence and/or machine learning techniques. According to embodiments, the at least one target network element may include at least one of edge site (e.g., Edge Data Center, RAN site, and the like), UE communicating with the edge site, and Operation Administrative and Management (OAM) in the network. According to embodiments, the at least one target network element may transmit a request for the at least one machine learning model to the MM system. According to embodiments, the central module of the MM system may be configured to store the at least one machine learning model. Accordingly, the MM system may be able to serve as a centralized store for machine learning models that are to be distributed and utilized within the network. The method then proceeds to operation S620.

At operation S620, the at least one processor may be configured to distribute the at least one machine learning model. According to embodiments, the at least one processor may be configured to distribute the at least one machine learning model to at least one target network element. According to embodiments, the central module of the MM system may be configured to distribute the at least one machine learning model to the at least one target network element via the at least one edge module of the MM system. According to embodiments, the at least one target network element may be within the same network as the MM system.

Upon performing operation S620, the method 600 may be ended or be terminated. Alternatively, method 600 may return to operation S610, such that the at least one processor may be configured to repeatedly perform, for at least a predetermined amount of time, the storing the at least one machine learning model (at operation S610) and the distributing the at least one machine learning model (at operation S620). For instance, the at least one processor may continuously (or periodically) obtain more machine learning models to be used by the at least one target network element, and then restart the storing the at least one machine learning model (at operation S610) and the distributing the at least one machine learning model (at operation S620).

To this end, the system of the present disclosure may store and distribute machine learning models in the network.

Example Operations for Managing Machine Learning Models in the Present Disclosure In the following several example operations performable by the at least one processor for managing machine learning models are described with reference to FIG. 7.

Figure 7:
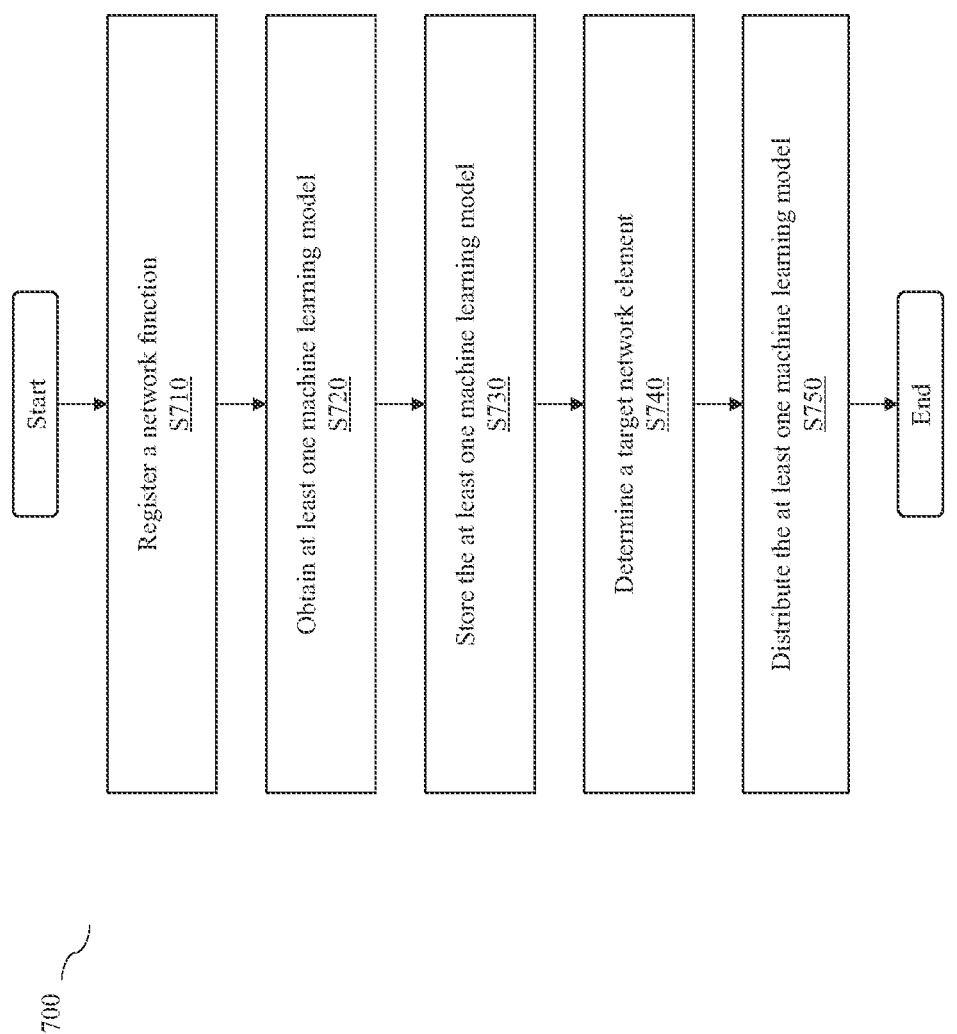
FIG. 7 illustrates a flow diagram of an example method for managing machine learning models, according to one or more embodiments.

FIG. 7 illustrates a flow diagram of an example method 700 for managing machine learning models, according to one or more embodiments. One or more operations of method 700 may be part of operations S610 and S620, in method 600, and may be performed by at least one processor (e.g., processor 220) of the MM system.

As illustrated in FIG. 7 at operation S710, the at least one processor may be configured to register a network function. According to embodiments, the MM system may be implemented as a network function, where the at least one processor may be configured to register such network function with a core network, in order to allow other network functions within the core network to discover and utilize the MM system. For example, the at least one processor may be configured to register the MM system as a Model Repository Function (MRF) with the Network Exposure Function (NEF) in the 5G core, such that other network functions in the 5G core can discover and utilize the MRF. According to embodiments, the central module of the MM system may be configured to register the network function. The method then proceeds to operation S720.

At operation S720, the at least one processor may be configured to obtain at least one machine learning model. It may be understood that the at least one machine learning model is a machine learning model that is to be utilized by at least one target network element in the network. According to embodiments, the at least one target network element may refer to a network element within the network that is configured to utilize the at least one machine learning model to perform artificial intelligence and/or machine learning techniques. According to embodiments, the at least one target network element may include at least one of edge sites (e.g., Edge Data Center, RAN site, and the like), UE communicating with the edge site, and Operation Administrative and Management (OAM) in the network. According to embodiments, the at least one target network element may transmit a request for the at least one machine learning model to the MM system (and/or to the registered network function MRF), where the at least one processor may be configured to obtain the at least one machine learning model in response to receiving said request. According to embodiments, the central module of the MM system may be configured to obtain the at least one machine learning model.

According to embodiments, the at least one processor may be configured to obtain the at least one machine learning model by training the at least one machine learning model. According to embodiments, the at least one processor may be configured to obtain training data from any one or more elements within the network, and then train the at least one machine learning model based on such training data. For example, the at least one processor may be configured to obtain training data from any one or more of an Operation Administrative and Management (OAM), eNodeB, User Equipment (UE), and the like in the network. It may be understood that different machine learning models with different utilizations (i.e., functions, purposes, and the like) may need to be trained based on different types of data obtained from different elements within the network. As such, the training data may be obtained based on the intended utilization of the at least one machine learning model.

According to embodiments, the at least one processor may be configured to obtain the at least one machine learning model by receiving the at least one machine learning model from at least one element within the network. According to embodiments, the at least one element may be configured to train the at least one machine learning model based on training data, and transmit the trained at least one machine learning model to the MM system. According to embodiments, the at least one element may include one or more of an Aggregate Data Center, Application Function, and 3rd Party Application Servers in the network.

It may be understood that the training data and the training method for training the at least one machine learning model may be determined based on implementation and the intended utilization of the at least one machine learning model as appropriate. The method then proceeds to operation S730.

At operation S730, the at least one processor may be configured to store the obtained at least one machine learning model. According to embodiments, the at least one machine learning model may be stored by the central module of the MM system, in the similar manner as operation S610 in method 600. The method then proceeds to operation S740.

At operation S740, the at least one processor may be configured to determine the at least one target network element for the at least one machine learning model. According to embodiments, the at least one processor may be configured to determine the at least one target network element that the at least one machine learning model should be transmitted to. According to embodiments, each of the at least one machine learning model may be associated with metadata, where such metadata may specify information related to the respective one of the at least one machine learning model. For example, the metadata may specify one or more of a name, format, purpose, expiry date of the model (i.e., how long the model is valid for), date and time of generation/training of the model, size, inference confidence score, target edge site (e.g., Edge data center, eNodeB, and the like), target geographical area (e.g., eNodeB, Tracking Area Identity (TAI), and the like), target User Equipment (UE), and the like. It may be understood that the metadata may be stored along with the respective one of the at least one machine learning model itself. Accordingly, the at least one processor may be configured to determine the at least one target network element, based on the metadata associated with the respective one of the at least one machine learning model.

It may be understood that any number of the at least one machine learning model may be transmitted to any combination of the target network element without limitation. For example: one machine learning model may be transmitted to one edge site, while another machine learning model may be transmitted to another edge site; one machine learning model may be transmitted to one edge site, while another machine learning model may be transmitted to a UE communicatively coupled to the one edge site; more than one machine learning model may be transmitted to one edge site, and the like. According to embodiments, the central module of the MM system may be configured to determine the at least one target network element. The method then proceeds to operation S750.

At operation S750, the at least one processor may be configured to distribute the at least one machine learning model. According to embodiments, the at least one processor may be configured to distribute the at least one machine learning model to the at least one target network element.

According to embodiments, the at least one processor may be configured to distribute the at least one machine learning model to the at least one target network element, by transmitting each of the at least one machine learning model to the corresponding at least one target network element.

According to embodiments, the at least one processor may be configured to transmit each of the at least one machine learning model to the corresponding at least one target network element based on the determination made during operation S740. It may be understood that, depending on the implementation, the at least one machine learning model may be transmitted at any time as appropriate. For example, the at least one machine learning model may be transmitted during off-peak hours to minimize network impact.

According to embodiments, the central module of the MM system may be configured to distribute the at least one machine learning model to the at least one target network element via the at least one edge module of the MM system. According to embodiments, the central module may be configured to transmit each of the at least one machine learning model to the edge module, where the edge module may be configured to store a local cache of the at least one machine learning model to be utilized by the corresponding at least one target network element.

It may be understood that, for example, if the edge module is hosted in a data center next to a RAN/NG-RAN node in the 5G network, once the at least one machine learning model is distributed, a cache of the at least one machine learning model may be stored in the data center, where the RAN/NG-RAN may perform inference on the at least one machine learning model as appropriate. Further, for example, as the UE moves across cell sites, the most suitable cached machine learning model from the local edge site may be utilized.

Upon performing operation S750, the method 700 may be ended or be terminated. Alternatively, method 700 may return to operation S720, such that the at least one processor may be configured to repeatedly perform, for at least a predetermined amount of time, the obtaining the at least one machine learning model (at operation S720), the storing the at least one machine learning model (at operation S730), the determining the at least one target network element (at operation S740), and the distributing the at least one machine learning model (at operation S750).

For example, the at least one processor may be previously obtained, stored, and distributed machine learning models A and B to target network elements A and B, respectively. Then, the at least one processor may obtain a new machine learning model C to be utilized by a new target network element C, and then restart the obtaining the at least one machine learning model (at operation S720), the storing the at least one machine learning model (at operation S730), the determining the at least one target network element (at operation S740), and the distributing the at least one machine learning model (at operation S750).

As another example, the at least one processor may be previously obtained, stored, and distributed machine learning models A and B to target network elements A and B, respectively. Then, the machine learning model A may be updated (by the MM system or the at least one element within the network) by being trained based on more training data. Accordingly, the at least one processor restarts the obtaining the at least one machine learning model (at operation S720), the storing the at least one machine learning model (at operation S730), the determining the at least one target network element (at operation S740), and the distributing the at least one machine learning model (at operation S750).

In such case, it may be understood that, depending on the implementation, the at least one machine learning model may be transmitted to the at least one target network element according to a schedule, such as periodically (e.g., nightly), and the like. For example, the at least one target network element may transmit a request to receive an updated machine learning model nightly, where operations S720 to S750 may be repeated for the updated machine learning model nightly.

In any event, it may be understood that the distribution as well as the receiving/training of the machine learning model may be performed at any time as appropriate based on the implementation.

Example Implementation Environment

Figure 8:
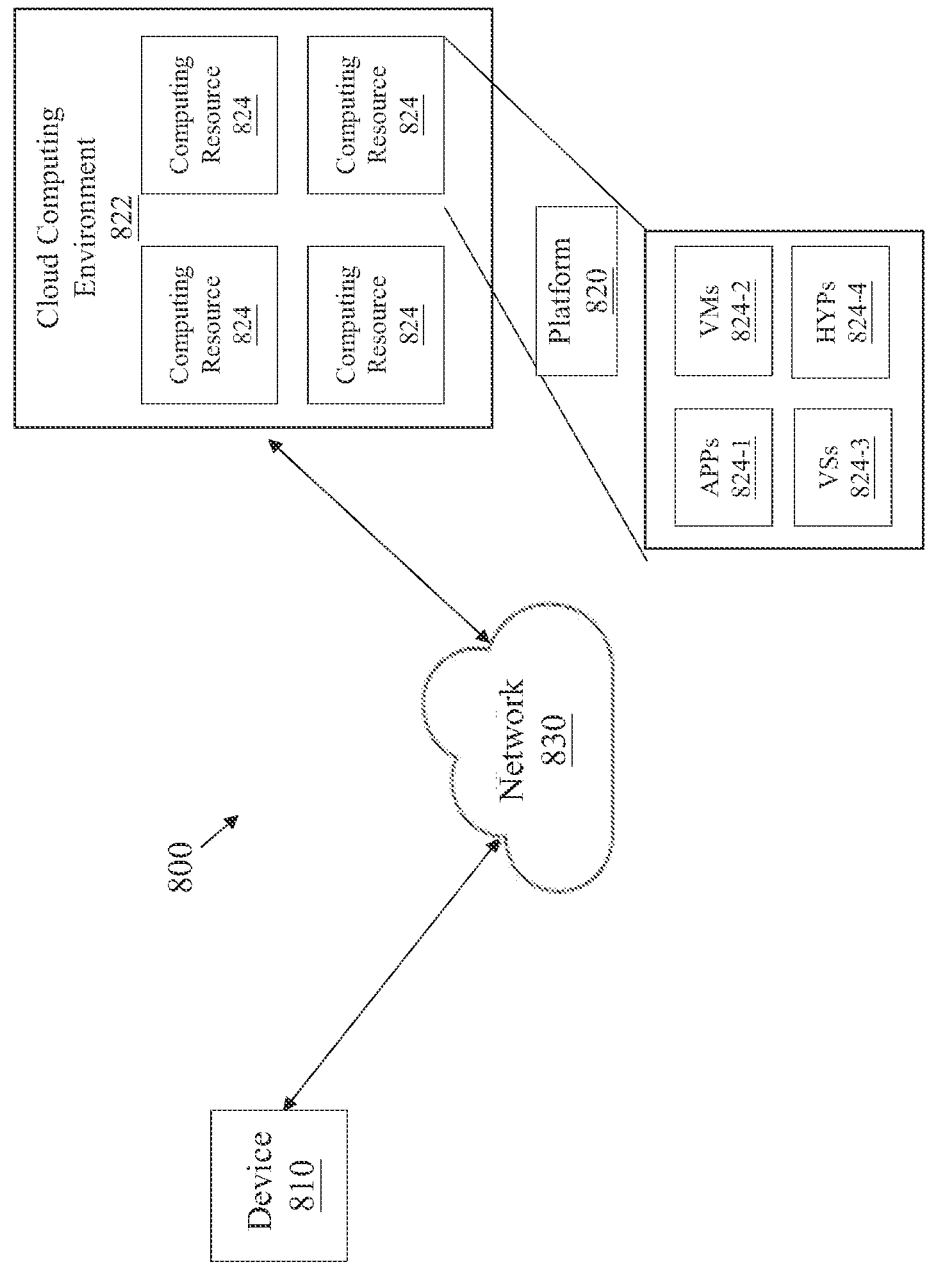
FIG. 8 illustrates a diagram of an example environment in which systems and/or methods, described herein, may be implemented.

FIG. 8 illustrates a diagram of an example environment 800 in which systems and/or methods, described herein, may be implemented. As shown in FIG. 8, environment 800 may include a device 810, a platform 820, and a network 830. Devices of environment 800 may interconnect via wired connections, wireless connections, or a combination of wired and wireless connections. In some embodiments, any of the functions and operations described with reference to FIG. 1 to FIG. 7 above may be performed by any combination of elements illustrated in FIG. 8.

According to embodiments, the MM system described herein may be stored, hosted, or deployed in the cloud computing platform 820. In this regard, device 810 may include a device, system, equipment, or the like, utilized by the user (e.g., user of a marketing team, user of a network planning team, etc.) to access the MM system. In that case, device 810 may include one or more devices capable of receiving, generating, storing, processing, and/or providing information associated with platform 820.

Platform 820 includes one or more devices capable of receiving, generating, storing, processing, and/or providing information. In some implementations, platform 820 may include a cloud server or a group of cloud servers. In some implementations, platform 820 may be designed to be modular such that certain software components may be swapped in or out depending on a particular need. As such, platform 820 may be easily and/or quickly reconfigured for different uses.

In some implementations, as shown, platform 820 may be hosted in cloud computing environment 822. Notably, while implementations described herein describe platform 820 as being hosted in cloud computing environment 822, in some implementations, platform 820 may not be cloud-based (i.e., may be implemented outside of a cloud computing environment) or may be partially cloud-based.

Cloud computing environment 822 includes an environment that hosts platform 820. Cloud computing environment 822 may provide computation, software, data access, storage, etc. services that do not require end-user (e.g., user device 810) knowledge of a physical location and configuration of system(s) and/or device(s) that hosts platform 820. As shown, cloud computing environment 822 may include a group of computing resources 824 (referred to collectively as "computing resources 824" and individually as "computing resource 824").

Computing resource 824 includes one or more personal computers, a cluster of computing devices, workstation computers, server devices, or other types of computation and/or communication devices. In some implementations, computing resource 824 may host platform 820. The cloud resources may include compute instances executing in computing resource 824, storage devices provided in computing resource 824, data transfer devices provided by computing resource 824, etc. In some implementations, computing resource 824 may communicate with other computing resources 824 via wired connections, wireless connections, or a combination of wired and wireless connections.

As further shown in FIG. 8, computing resource 824 includes a group of cloud resources, such as one or more applications ("APPs") 824-1, one or more virtual machines ("VMs") 824-2, virtualized storage ("VSs") 824-3, one or more hypervisors ("HYPs") 824-4, or the like. While the current example embodiment is with reference to virtualized network functions, it is understood that one or more other embodiments are not limited thereto, and may be implemented in at least one of containers, cloud-native services, one or more container platforms, etc. For example, in one or more other example embodiments, any of the above-described components may be a software-based component deployed or hosted in, for example, a server cluster such as a hybrid cloud server, data center servers, and the like. The software-based component may be containerized and may be deployed and controlled by one or more machines, called "nodes", that run or execute the containerized network elements and are addressable. In this regard, a server cluster may contain at least one master node and a plurality of worker nodes, wherein the master node(s) controls and manages a set of associated worker nodes.

Application 824-1 includes one or more software applications that may be provided to or accessed by user device 810. Application 824-1 may eliminate a need to install and execute the software applications on user device 810. For example, application 824-1 may include software associated with platform 820 and/or any other software capable of being provided via cloud computing environment 822. In some implementations, one application 824-1 may send/receive information to/from one or more other applications 824-1, via virtual machine 824-2.

Virtual machine 824-2 includes a software implementation of a machine (e.g., a computer) that executes programs like a physical machine. Virtual machine 824-2 may be either a system virtual machine or a process virtual machine, depending upon use and degree of correspondence to any real machine by virtual machine 824-2. A system virtual machine may provide a complete system platform that supports execution of a complete operating system ("OS"). A process virtual machine may execute a single program, and may support a single process. In some implementations, virtual machine 824-2 may execute on behalf of a user (e.g., user device 810), and may manage infrastructure of cloud computing environment 822, such as data management, synchronization, or long-duration data transfers.

Virtualized storage 824-3 includes one or more storage systems and/or one or more devices that use virtualization techniques within the storage systems or devices of computing resource 824. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 824-4 may provide hardware virtualization techniques that allow multiple operating systems (e.g., "guest operating systems") to execute concurrently on a host computer, such as computing resource 824. Hypervisor 824-4 may present a virtual operating platform to the guest operating systems, and may manage the execution of the guest operating systems. Multiple instances of a variety of operating systems may share virtualized hardware resources.

Network 830 may include one or more wired and/or wireless networks. For example, network 830 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

VARIOUS ASPECTS OF EMBODIMENTS

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s) module, segment, or portion of instructions, which includes one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Various further respective aspects and features of embodiments of the present disclosure may be defined by the following items:

Item [1]: A system that may include: a memory storage storing computer-executable instructions; and at least one processor communicatively coupled to the memory storage, wherein the at least one processor may be configured to execute the instructions to: store at least one machine learning model; and distribute the at least one machine learning model to at least one target network element in a network; wherein the system may be implemented as a network function in a core network.

Item [2]: The system according to item [1], wherein the at least one target network element may include one or more of Edge Data Center, RAN site, User Equipment, and Operation Administrative and Management (OAM).

Item [3]: The system according to any one of items [1]-[2], wherein the at least one processor may be further configured to determine the at least one target network element that the at least one machine learning model should be transmitted to based on metadata associated with the respective one of the at least one machine learning model.

Item [4]: The system according to any one of items [1]-[3], may further include a central module and at least one edge module.

Item [5]: The system according to item [4], wherein the central module may be configured to store the at least one machine learning model and distribute the at least one machine learning model to the at least one target network element via the at least one edge module.

Item [6]: The system according to any one of items [4]-[5], wherein the at least one edge module may be configured to store a local cache of the at least one machine learning model for the at least one target network element.

Item [7]: The system according to any one of items [4]-[6], wherein the central module and the at least one edge module may be located in a core network.

Item [8]: The system according to any one of items [4]-[7], wherein the central module may be located in a core network, and the at least one edge module may be located at or near at least one edge site in the network.

Item [9]: A method that may include: storing at least one machine learning model; and distributing the at least one machine learning model to at least one target network element in a network; wherein the method may be performed by a system implemented as a network function in a core network.

Item [10]: The method according to item [9], wherein the at least one target network element may include one or more of Edge Data Center, RAN site, User Equipment, and Operation Administrative and Management (OAM).

Item [11]: The method according to any one of items [9]-[10], may further include determining the at least one target network element that the at least one machine learning model should be transmitted to based on metadata associated with the respective one of the at least one machine learning model.

Item [12]: The method according to any one of items [9]-[11], wherein the system may include a central module and at least one edge module.

Item [13]: The method according to item [12], wherein the central module may be configured to store the at least one machine learning model and distribute the at least one machine learning model to the at least one target network element via the at least one edge module.

Item [14]: The method according to any one of items [12]-[13], wherein the at least one edge module may be configured to store a local cache of the at least one machine learning model for the at least one target network element.

Item [15]: The method according to any one of items [12]-[14], wherein the central module and the at least one edge module may be located in a core network.

Item [16]: The method according to any one of items [12]-[15], wherein the central module may be located in a core network, and the at least one edge module may be located at or near at least one edge site in the network.

Item [17]: A non-transitory computer-readable recording medium that may have recorded thereon instructions executable by at least one processor of a system to cause the at least one processor to perform a method including: storing at least one machine learning model; and distributing the at least one machine learning model to at least one target network element in a network; wherein the system may be implemented as a network function in a core network.

Item [18]: The non-transitory computer-readable recording medium according to item [17], wherein the at least one target network element may include one or more of Edge Data Center, RAN site, User Equipment, and Operation Administrative and Management (OAM).

Item [19]: The non-transitory computer-readable recording medium according to any one of items [17]-[18], wherein the method may further include determining the at least one target network element that the at least one machine learning model should be transmitted to based on metadata associated with the respective one of the at least one machine learning model.

Item [20]: The non-transitory computer-readable recording medium according to any one of items [17]-[19], wherein the system may include a central module and at least one edge module.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A system comprising:
a memory storage storing computer-executable instructions; and
at least one processor communicatively coupled to the memory storage, wherein the at least one processor is configured to execute the instructions to:
store at least one machine learning model; and
distribute the at least one machine learning model to at least one target network element in a network for use by the at least one target network element to perform inferences, the distributed at least one machine learning model being a trained model ready for use;
wherein the system is implemented as a centralized Model Repository Function in a core network for maintaining and distributing machine learning models in a telecommunications system.

2. The system according to claim 1, wherein the at least one target network element comprises one or more of Edge Data Center, radio access network (RAN) site, User Equipment, and Operation Administrative and Management (OAM), and wherein the at least one processor is configured to distribute the at least one machine learning model to the at least one target network element via an Access and Mobility Management Function (AMF) of the core network.

3. The system according to claim 1, wherein the at least one processor is further configured to determine the at least one target network element that the at least one machine learning model is to be transmitted to based on metadata associated with the respective one of the at least one machine learning model.

4. The system according to claim 1, further comprising a central module and at least one edge module.

5. The system according to claim 4, wherein the central module is configured to store the at least one machine learning model and distribute the at least one machine learning model to the at least one target network element via the at least one edge module.

6. The system according to claim 4, wherein the at least one edge module is configured to store a local cache of the at least one machine learning model for the at least one target network element.

7. The system according to claim 4, wherein the central module and the at least one edge module are located in a core network.

8. The system according to claim 4, wherein the central module is located in a core network, and the at least one edge module is located at or near at least one edge site in the network.

9. A method, comprising:
storing at least one machine learning model; and
distributing the at least one machine learning model to at least one target network element in a network for use by the at least one target network element to perform inferences, the distributed at least one machine learning model being a trained model ready for use;
wherein the method is performed by a system implemented as a centralized Model Repository Function in a core network for maintaining and distributing machine learning models in a telecommunications system.

10. The method according to claim 9, wherein the at least one target network element comprises one or more of Edge Data Center, RAN site, User Equipment, and Operation Administrative and Management (OAM).

11. The method according to claim 9, further comprising determining the at least one target network element that the at least one machine learning model is to be transmitted to based on metadata associated with the respective one of the at least one machine learning model.

12. The method according to claim 9, wherein the system comprises a central module and at least one edge module.

13. The method according to claim 12, wherein the central module is configured to store the at least one machine learning model and distribute the at least one machine learning model to the at least one target network element via the at least one edge module.

14. The method according to claim 12, wherein the at least one edge module is configured to store a local cache of the at least one machine learning model for the at least one target network element.

15. The method according to claim 12, wherein the central module and the at least one edge module are located in a core network.

16. The method according to claim 12, wherein the central module is located in a core network, and the at least one edge module is located at or near at least one edge site in the network.

17. A non-transitory computer-readable recording medium having recorded thereon instructions executable by at least one processor of a system to cause the at least one processor to perform a method comprising:
storing at least one machine learning model; and
distributing the at least one machine learning model to at least one target network element in a network for use by the at least one target network element to perform inferences, the distributed at least one machine learning model being a trained model ready for use;
wherein the system is implemented as a centralized Model Repository Function in a core network for maintaining and distributing machine learning models in a telecommunications system.

18. The non-transitory computer-readable recording medium according to claim 17, wherein the at least one target network element comprises one or more of Edge Data Center, RAN site, User Equipment, and Operation Administrative and Management (OAM).

19. The non-transitory computer-readable recording medium according to claim 17, wherein the method further comprises determining the at least one target network element that the at least one machine learning model is to be transmitted to based on metadata associated with the respective one of the at least one machine learning model.

20. The non-transitory computer-readable recording medium according to claim 17, wherein the system comprises a central module and at least one edge module.

* * * * *